United States Patent

Steinke

[11] Patent Number: 6,024,122
[45] Date of Patent: Feb. 15, 2000

[54] VALVE AND FILTER THEREFOR

[75] Inventor: Joseph H. Steinke, Mission Viejo, Calif.

[73] Assignee: Control Components Inc., Rancho Santa Margarita, Calif.

[21] Appl. No.: 09/030,379

[22] Filed: Feb. 25, 1998

[30] Foreign Application Priority Data

Feb. 25, 1997 [GB] United Kingdom .................... 9703874

[51] Int. Cl.[7] .................................................. F16K 37/00
[52] U.S. Cl. ...................... 137/545; 137/625.37; 251/282
[58] Field of Search ............................. 251/282; 137/550, 137/545, 625.33, 625.37

[56] References Cited

U.S. PATENT DOCUMENTS

| 1,807,446 | 5/1931 | Smeby | 137/625.37 |
| 4,384,592 | 5/1983 | Ng | 137/625.37 |
| 4,503,884 | 3/1985 | Spils | 137/553 |
| 4,834,133 | 5/1989 | LaCoste et al. | 137/315 |
| 5,540,412 | 7/1996 | Doll | 251/129.07 |
| 5,584,323 | 12/1996 | Yamamuro | 137/625.65 |
| 5,687,763 | 11/1997 | Steinke | 137/625.33 |

*Primary Examiner*—A. Michael Chambers
*Attorney, Agent, or Firm*—Pillsbury Madison & Sutro LLP

[57] ABSTRACT

A valve filter is provided particularly for a balanced pressure valve and provides a means of preventing particles passing, through the balance holes of the valve plug.

The valve comprises a valve housing and a valve plug movable in the housing to open and close the valve, the valve plug containing at least one balance hole, the balance hole defining a fluid communication channel through the valve plug, the fluid communication channel being provided with a filter, the filter comprising a body member and a plurality of elements, each element having a first end and a second end and being fixed at its first end to the body member and being, free at its second end, whereby the elements can deflect under pressure.

19 Claims, 2 Drawing Sheets

VALVE AND FILTER THEREFOR

FIELD OF THE INVENTION

This invention relates to a filter for a valve. It is particularly concerned with providing a suitable filter for a balanced pressure valve.

BACKGROUND OF THE INVENTION

A typical balance pressure valve comprises a pressure balanced shaft or plug with through holes to ensure that pressure forces are balanced on either side of the shaft or plug. The balance chamber over the plug may be a zone of zero fluid velocity where any particles carried suspended in a fluid to that zone may drop out of suspension there. Thus these through holes or balance holes can allow unwanted particulate material, e.g. pipe scale, grit and other debris, to pass through the plug. Such material can then cause sticking of the valve and possible damage to the valve. Although it is possible in principle to provide the balance holes with a conventional filter to prevent passage of particulates, should the filter become blocked, the balance holes will be unable to perform their necessary function of equalling pressure in the balance chamber, whether such change is due to fluid pressure changes or to volume displacement on opening and closing the valve.

It is an object of the present invention to provide a filter for a valve that overcomes these difficulties.

SUMMARY OF THE INVENTION

Accordingly, the invention provides in one aspect a valve comprising a valve housing and a valve plug moveable in the housing to open and close the valve, the plug containing at least one balance hole defining a fluid communication channel through the plug, the channel being provided with a filter comprising a body member and a number of elements, each element being fixed at one of its ends to the body member and free at its other end, whereby the element can deflect under pressure.

The filter may be, for example, in the form of a brush, the brush elements being fixed at one end to the brush body member but able to move or deflect at their free opposite ends. Alternatively, the filter may be, for example, formed from the pile or eye portion of a hook and eye type fastener, e.g. such as the commercially-available VELCRO. (VELCRO is a registered trade mark.).

For convenience the invention will hereafter be more specifically described with reference to a brush filter although it will be appreciated that it is not intended to be limited thereto.

The brush may be made of any suitable material, e.g. it may have elements in the form of strands of wire or plastics material. It may conveniently be in the form of a wheel with the fixed ends of the elements towards the centre and the free ends towards the circumference. It fills the communication channel so that while unwanted particulate material is blocked or deflected from the channel and does not pass through the channel, it causes no effective obstruction to necessary fluid flow. Hence the normal operational requirement of the balance hole is unaffected while damage to the valve or its operation due to unwanted debris can be significantly reduced.

In the event that the filter becomes blocked, it will eventually deflect under the build up of pressure, i.e. the free ends of its elements will move relative to its fixed ends, and hence it will still allow fluid flow (together with some particles), thereby acting as a safety relief device.

The brush construction and materials can be chosen to ensure suitable flexibility to allow deflection in these circumstances and to suit the particular valve operational conditions. Thus the materials and strand densities of the brush can be chosen by the average skilled man of the art to match the process fluid, operating temperatures and pressures and even the size and density of the type of particles likely to be encountered.

Accordingly, in another aspect the invention provides a filter for the plug of a pressure balance valve, the filter being of size to cover a balance hole through the plug to prevent passage of solid particulate material, the filter comprising a body member and a number of elements, each element being fixed at one of its ends to the body member and free to deflect at its other end, whereby the filter is sufficiently flexible to deflect under fluid pressure when clogged with debris. The filter may be fitted into the balance hole communication channel by any convenient means, e.g. nuts, bolts and washers.

BRIEF DESCRIPTION OF THE DRAWINGS

Embodiments of the invention will now be described by way of example only with reference to the accompanying drawings in which:

FIG. 1A is an enlarged view of area A of FIG. 1; and

DESCRIPTION OF THE PREFERRED EMBODIMENTS

Figure 1:
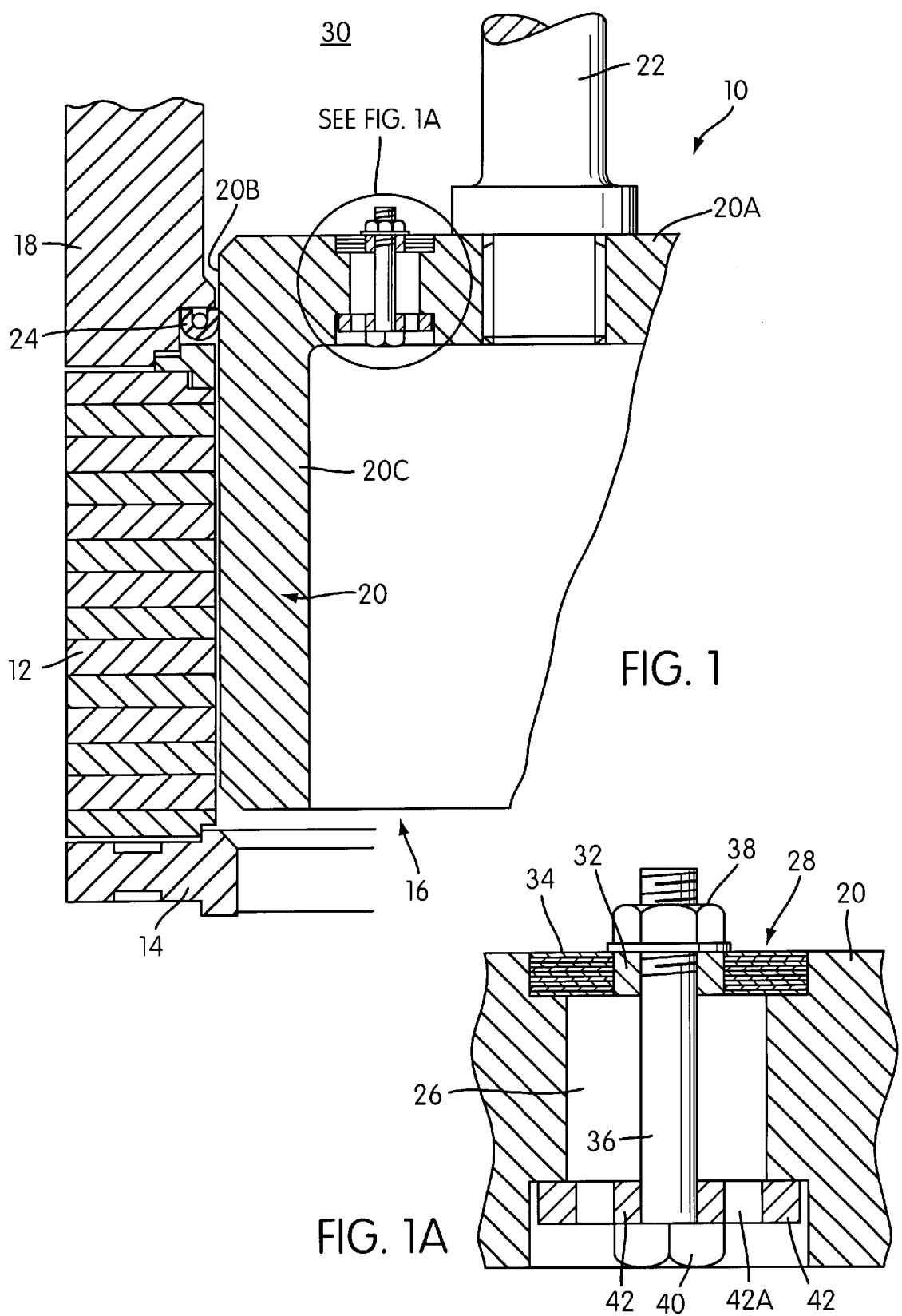
FIG. 1 is a diagrammatic illustration in cross-section of a portion of a first valve of the invention.

In FIGS. 1 and 1A, balance valve 10 comprises a cage or stack 12 of annular flow discs of conventional construction seated at one end on a seat ring 14 and with its other end in contact with a balance cylinder bonnet 18. The stack 12 defines a through bore 16. A valve plug 20 is movable backwards and forwards along bore 16 by means of stem or shaft 22. Valve plug 20 is of generally inverted U-shape in section and shaft 22 is sealingly attached by conventional means to the valve plug 20 at the centre of the base 20A of the "U".

An annular balance seal 24 engages the exterior surface 20B of the annular body 20C of the plug, again in conventional manner.

One or more balance holes or channels 26 are provided through base 20A of the plug 20, only one such hole being shown in the drawing. A brush filter 28 is mounted at the balance chamber 30 end of the hole 26 to cover the entrance to the hole. The brush filter 28 has a central annular body member 32 and brush elements 34. Each brush element 34 is fixed at one of its ends to body member 32 and is free at its opposite end. Body member 32 is mounted at the entrance to the hole by means of a bolt 36 which passes through member 32 and travels through the length of hole 26. Bolt 36 is secured in the hole 26 by a retaining nut 38, 40 at each end and a washer 42 at the end opposite to brush filter 28. Washer 42 has an annular hole 42A to allow fluid passage through hole 26.

Any unwanted debris that would otherwise pass through hole 26 will be caught in or deflected by filter 28. However, should the filter become clogged with debris and thereby block hole 26 it will then deflect under pressure, thereby re-opening hole 26 to fluid flow.

The arrangement shown in FIGS. 1 and 1A is particularly suitable for relatively large size plug-valve constructions.

Figure 2:
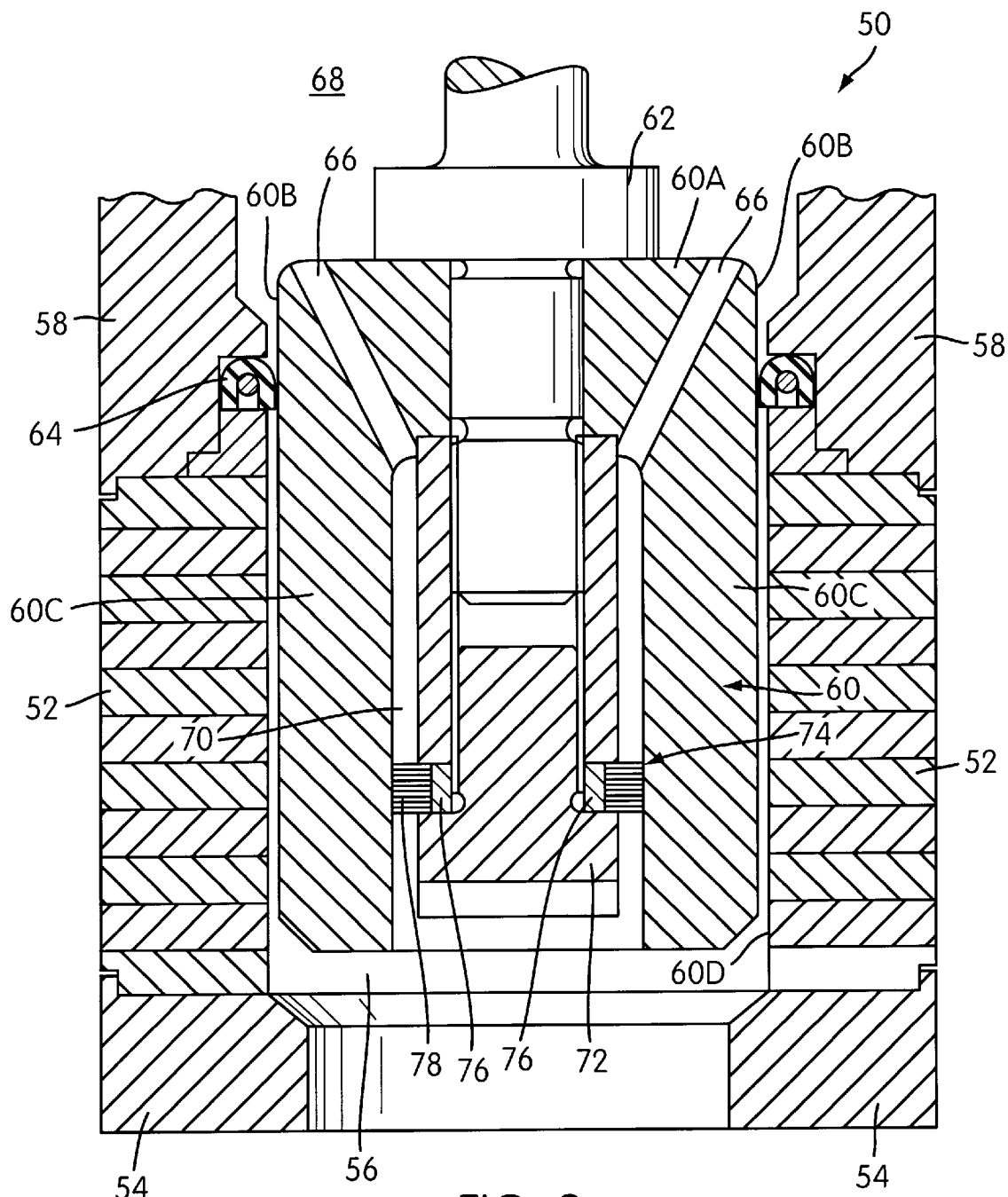
FIG. 2 is a diagrammatic illustration in cross-section of a portion of a second valve of the invention.

The arrangement of FIG. 2 is particularly suitable for smaller plug-valve constructions.

In FIG. 2, balance valve 50 also comprises a cage or stack 52 of annular flow discs seated at one end on a seat ring 54 and defining a bore 56 and with its other end in contact with a balance cylinder bonnet 58. A valve plug 60 is movable backwards and forwards along bore 56 by means of a stem or shaft 62. Again valve plug 60 is of generally inverted U-shape in section and shaft 62 is sealingly attached to valve plug 60 at the center of the base 60A of its "U".

An annular balance seal 64 engages the exterior surface 60B of the annular body of 60C of the plug.

Two balance holes 66 are provided at an angle through bore 60A of the plug 60 from balance chamber 68 to an interior annular space 70 defined between the interior annular surface 60D of the plug and the exterior surface of an extension 72 of stem 62. Annular space 70 together with holes 66 provides the desired fluid communication channels through plug 60.

A brush filter 74 comprising a central annular body member 76 and brush elements 78 is mounted on extension 72 to extend across the fluid communication channels in annular space 70. The free ends of elements 78 contact the interior surface 60D of plug 60 and the fixed ends are attached to body member 76.

As with the FIG. 1 arrangement, the filter 74 prevents debris from passing through the valve plug except if and when the filter becomes clogged. In this eventuality, the free ends of the brush filter will deflect under pressure, allowing fluid (and debris) to pass.

I claim:

1. A valve comprising a valve housing and a valve plug movable in the housing to open and close the valve, the valve plug containing at least one balance hole, the balance hole defining a fluid communication channel through the valve plug, the fluid communication channel being provided with a filter, the filter comprising a body member and a plurality of elements, each element having a first end and a second end and being fixed at its first end to the body member and being free at its second end, whereby the elements can deflect under pressure.

2. A valve according to claim 1, in which the filter is formed from the eye portion of a hook and eye type fastener.

3. A valve according to claim 1, in which the filter is in the form of a brush comprising said body member and said elements, the brush elements being fixed at their first ends to the brush body member and being able to deflect at their opposite, second, free ends.

4. A valve according to claim 3, in which the elements of the brush are in the form of strands of material selected from the group consisting of wire and plastics material.

5. A valve according to claim 3, in which the brush is in the form of a wheel with the fixed first ends of the elements towards the center of the wheel and the free second ends towards its circumference.

6. A valve according to claim 1, in which the filter is fitted into the fluid communication channel using nuts, bolts and washers.

7. A valve according to claim 1, in which the valve comprises a stack of annular flow discs, the stack defining a through bore to contain the valve plug.

8. A valve according to claim 7, in which the valve plug is of inverted "U"-shape in section and is movable backwards and forwards along the bore by a shaft attached to the base of the "U".

9. A valve according to claim 8, in which the balance hole is provided through the base of the "U".

10. A valve according to claim 8, in which a cylindrical member extends between the arms of the "U" of the valve plug from the base of the "U" to provide an annular space defined by the interior surface of the "U" and the exterior surface of the cylindrical member, a plurality of said balance holes extend through and are inclined to the base of the "U" to communicate with the annular space and the filter is of annular form positioned in the annular space.

11. A filter for the valve plug of a pressure balance valve, the valve having a balance hole through the plug, the filter being of size to cover the balance hole through the plug to prevent passage of solid particulate material, the filter comprising a body member and a plurality of elements, each element having a first end and a second end and being fixed at its first end to the body member and being free to deflect at its second end, whereby the filter is sufficiently flexible to deflect under fluid pressure when clogged with debris.

12. A filter according to claim 11, which is formed from the eye portion of a hook and eye type fastener.

13. A filter according to claim 11, which is in the form of a brush comprising said body member and said elements, said elements being fixed at their first ends to the brush body member and being able to deflect at their opposite second free ends.

14. A filter according to claim 13, in which the elements of the brush are in the form of strands of material selected from the group consisting of wire and plastics material.

15. A filter according to claim 13, in which the brush is in the form of a wheel with the fixed first ends of the elements towards the center of the wheel and the free second ends towards its circumference.

16. A balance pressure valve comprising:

a valve housing;

a valve plug movable in the housing to open and close the valve, said valve plug having at least one balance hole defining a fluid communication channel through the valve plug to enable balancing of pressure on opposite sides of said plug; and a filter disposed in said fluid communication channel and constructed and positioned to permit fluid flow through said fluid communication channel while substantially preventing unwanted debris from passing through said communication channel;

said filter constructed and arranged to move so as to permit fluid flow and passage of debris past the filter in response to a pressure differential thereacross which may be created upon clogging of said filter.

17. A valve according to claim 16, wherein said filter comprises a brush filter.

18. A valve according to claim 16, wherein said filter comprises a fixed body member and filter material connected to said body member, said filter material being deflectable to enable the movement of said filter that permits said fluid flow and passage of debris in response to said pressure differential.

19. A valve according to claim 16, wherein said housing comprises a plurality of stacked annular flow discs, said valve plug being movable within a bore defined by said flow discs so as to open and close said valve and hence fluid flow through said flow discs.

* * * * *